(12) United States Patent
Mullin

(10) Patent No.: US 8,723,464 B2
(45) Date of Patent: May 13, 2014

(54) PERMANENT MAGNET MOTOR SYSTEM

(75) Inventor: Paul Mullin, Yellow Springs, OH (US)

(73) Assignee: Regal Beloit America, Inc., Beloit, WI (US)

( * ) Notice: Subject to any disclaimer, the term of this patent is extended or adjusted under 35 U.S.C. 154(b) by 371 days.

(21) Appl. No.: 13/114,535

(22) Filed: May 24, 2011

(65) Prior Publication Data

US 2012/0299516 A1 Nov. 29, 2012

(51) Int. Cl.
*H02P 6/18* (2006.01)

(52) U.S. Cl.
USPC ............ 318/400.34; 318/400.01; 318/400.32; 318/400.35; 318/721; 388/928.1; 388/909

(58) Field of Classification Search
USPC ............ 318/400.01, 400.4, 400.32, 721, 799, 318/432, 434, 437, 811, 400.33, 400.34, 318/400.35, 599, 812; 388/901, 928.1, 909; 361/91.7
See application file for complete search history.

(56) References Cited

U.S. PATENT DOCUMENTS

| | | | |
|---|---|---|---|
| 4,678,973 A | 7/1987 | Elliott et al. | |
| 5,023,527 A | 6/1991 | Erdman et al. | |
| 5,631,527 A | 5/1997 | Canclini | |
| 5,672,944 A * | 9/1997 | Gokhale et al. | 318/400.23 |
| 5,859,520 A | 1/1999 | Bourgeois et al. | |
| 6,777,898 B2 | 8/2004 | Peterson | |
| 7,116,070 B2 | 10/2006 | MacKay | |
| 7,301,298 B2 * | 11/2007 | Shao et al. | 318/599 |
| 7,514,887 B2 | 4/2009 | Mullin et al. | |
| 7,652,858 B2 | 1/2010 | Tang et al. | |
| 2001/0000293 A1 * | 4/2001 | Makaran | 318/254 |
| 2003/0231875 A1 * | 12/2003 | Masino | 388/928.1 |
| 2011/0068723 A1 * | 3/2011 | Maiocchi | 318/400.3 |

FOREIGN PATENT DOCUMENTS

WO 9608076 3/1996
WO 2009006172 1/2009

OTHER PUBLICATIONS

PCT/US2012/039170 International Search Report and Written Opinion dated Nov. 29, 2012 (9 pages).

* cited by examiner

*Primary Examiner* — Antony M Paul
(74) *Attorney, Agent, or Firm* — Michael Best & Friedrich LLP

(57) ABSTRACT

A sensorless permanent magnet motor system that prevents negative torque caused by back EMF. The system determines the position of the rotating permanent magnet by monitoring back EMF generated on an inactive coil of the motor system. A snubber circuit is used to prevent the back EMF from causing negative torque on the motor. The voltage of back EMF used to power a logic circuit, such as a microcontroller, that controls the operation of the motor. The microcontroller controls the operation of the motor by detecting back EMF and is also partially powered by the back EMF.

14 Claims, 5 Drawing Sheets

PERMANENT MAGNET MOTOR SYSTEM

BACKGROUND

The invention relates to control circuits for permanent magnet motors, specifically control circuits that manage back EMF generated by the permanent magnet motor to prevent damage to the motor or control circuit.

SUMMARY

Permanent magnet motors are controlled by selectively energizing motor coils, thereby creating a magnetic field and causing the permanent magnet mounted on the rotor of the motor to move. The motor coils are selectively energized based on the position of the rotor. Some known motor systems include a Hall-effect sensor to determine the position of the rotor and to operate the control circuit accordingly. However, the Hall-effect sensor adds size and cost to the motor system.

Furthermore, when a motor coil is not energized, the rotating permanent magnet can induce a back EMF (Electromotive force) on the inactive motor coil. If the back EMF is not controlled, it can cause negative torque on the motor and causes damage to the components of the control circuit.

Embodiments of the invention provide a sensorless permanent magnet motor system that prevents negative torque caused by back EMF. In certain embodiments, the invention determines the position of the rotating permanent magnet by monitoring back EMF generated on an inactive coil of the motor system. A snubber circuit is used to prevent the back EMF from causing negative torque on the motor. In some embodiments, the voltage of back EMF used to power a logic circuit, such as a microcontroller, that controls the operation of the motor. In such embodiments, the microcontroller controls the operation of the motor by detecting back EMF and is also partially powered by the back EMF.

One embodiment of the invention provides a sensorless electric motor system having a power supply circuit, an electric motor, and a control circuit. The power supply circuit is configured to provide a first DC voltage. The electric motor includes a permanent magnet rotor and a plurality of coils. Each coil is positioned in a series-type arrangement with a corresponding low-side switch. The controller circuit is powered by the second DC voltage and configured to control movement of the electric motor. The control circuit controls movement of the electric motor by monitoring a back EMF generated by the permanent magnet rotor on one or more of the plurality of coils determining a position of the permanent magnet rotor based on the back EMF, and selectively opening and closing the low-side switches based on the determined position of the permanent magnet rotor.

In some embodiments, the sensorless electric motor system includes a plurality of snubber circuits that prevent the back EMF generated by the permanent motor rotor from causing negative torque on the electric motor. In some embodiments, the controller circuit includes a microcontroller. In some embodiments, the power supply includes an AC-to-DC converter and a capacitor on the AC side configured to float the dc voltage provided to the controller circuit. Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
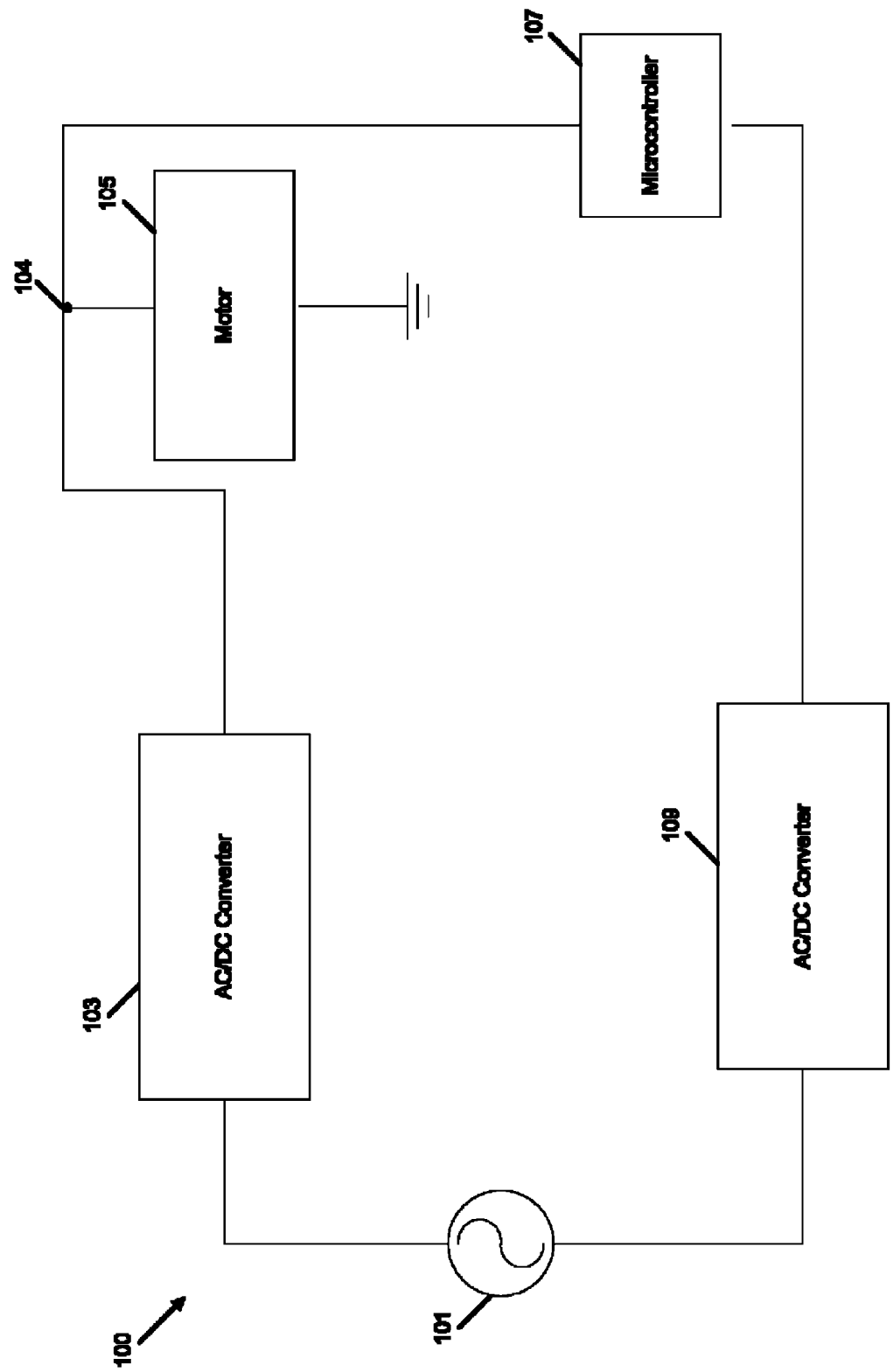
FIG. 1 is a schematic representation of a power supply and control circuit for a permanent magnet motor.

FIG. 1 shows a simplified schematic representation of a power supply 100. The AC power source 101 provides AC power to the AC/DC converter 103, which converts the AC power to DC power and generates a first DC voltage at node 104. The first DC voltage powers the motor 105. The second AC/DC converter 109 converts AC power to DC power and generates a second DC voltage that powers microcontroller 107. Because the second DC voltage is provided to power a microcontroller 107 while the first DC voltage is provided to power the motor 105, the second DC voltage is much lower than the first DC voltage.

Figure 2:
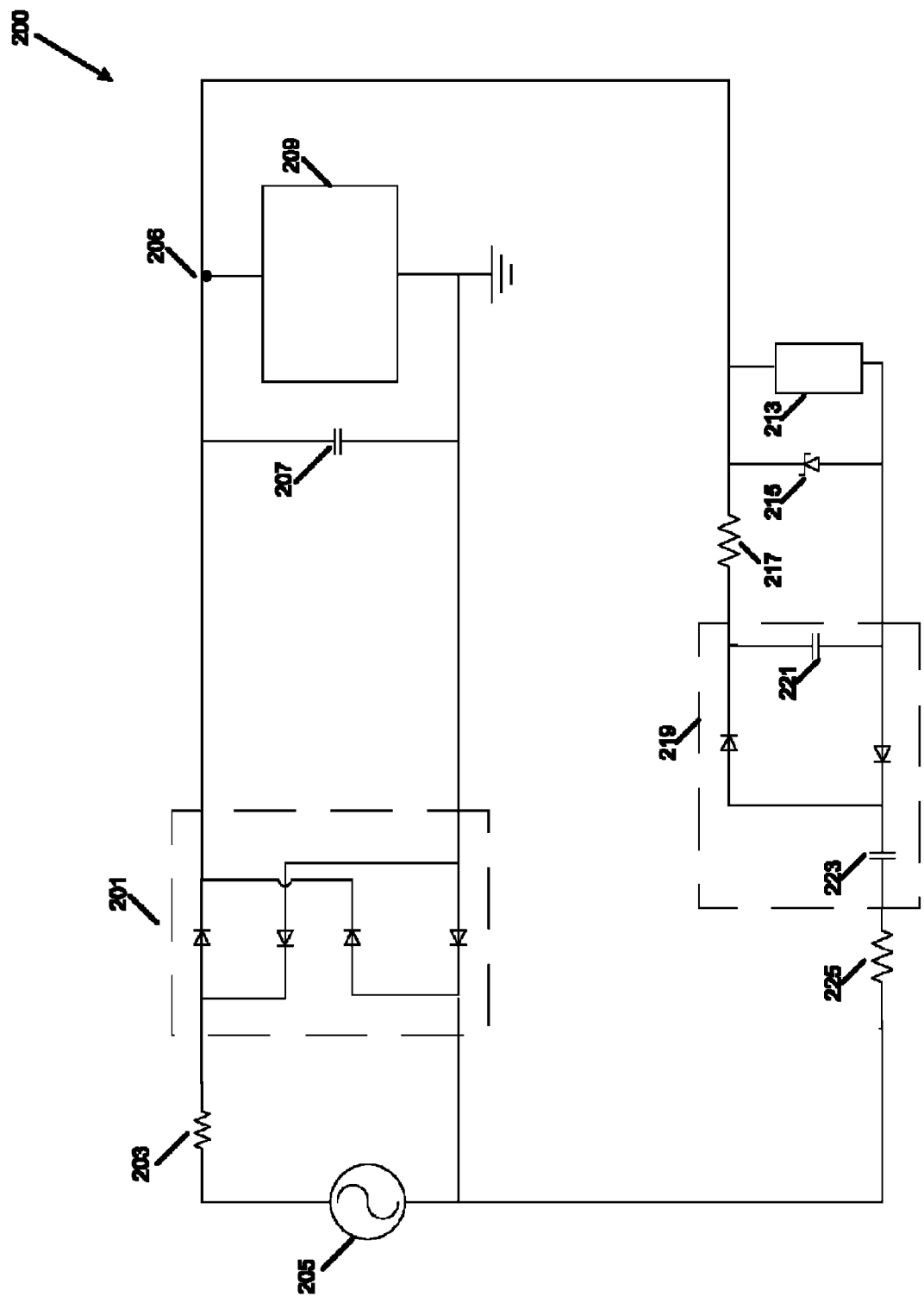
FIG. 2 is schematic representation of the power supply and control circuit illustrated in FIG. 1.

FIG. 2 provides a detailed schematic illustration of one construction 200 of the power supply 100 illustrated in FIG. 1. The AC/DC converter is in the form of a full-bridge rectifier 201 positioned with a resistor 203 across the AC power source 205. The AC power from the AC power source 205 is converted to DC power by the rectifier 201 and a first DC voltage is generated at node 206. A capacitor 207 is positioned in parallel with the motor 209 and filters the first DC voltage before it reaches a motor 209. The first DC voltage powers the motor 209.

An AC/DC converter 219 converts AC power from the AC power source 205 to DC power and generates a second DC voltage. The second DC voltage powers a control circuit 213. The AC/DC converter 219 is a half-wave bridge rectifier that includes two capacitors 221, 223, a diode, and a negative facing diode. A resistor 225 is connected to the capacitor 223 in a series-type arrangement.

Figure 3:
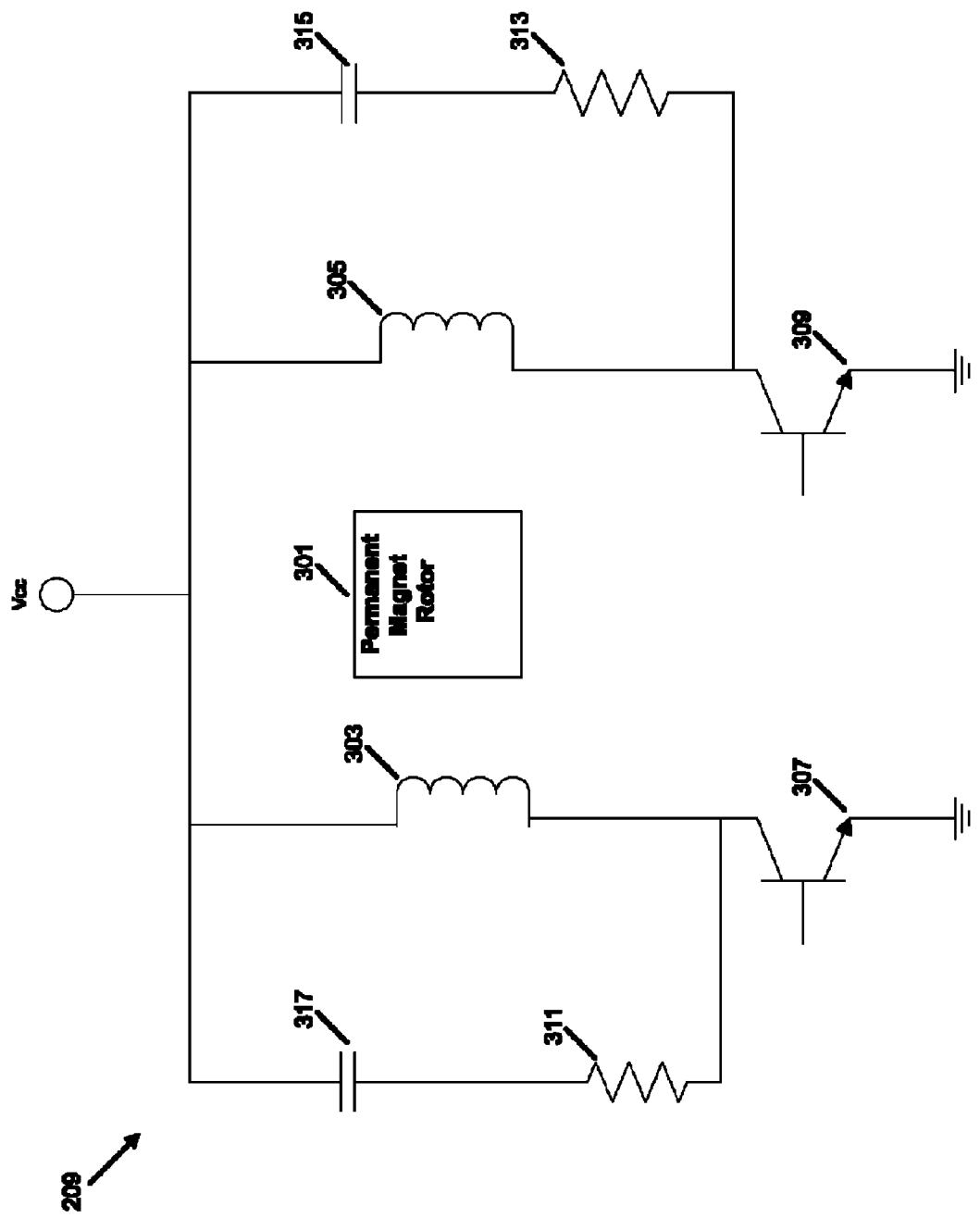
FIG. 3 is a schematic representation of the permanent magnet motor including a snubber circuit on each of the coils.

FIG. 3 shows a motor 209. The motor 209 is powered by the first DC voltage. A permanent magnet rotor 301 is positioned between the inductor coils 303 and 305. The inductor coils 303 and 305 each are coupled to the collectors of switches 307 and 309, respectively. The switches 307 and 309 are operated by the microcontroller 213 (FIG. 2) and are grounded at their emitter. In this construction, snubber circuits are coupled to the motor coil in a parallel-type arrangement with the inductors 303 and 305 to prevent back EMF generated by the permanent magnet on an inactive coil (i.e., when the corresponding switch is open) from causing negative torque on the motor. Each snubber circuit includes a resistor 311 or 313 coupled in series with a capacitor 315 or 317.

The terms "parallel-type arrangement" and "series-type arrangement" as used herein refer to the arrangement of the listed components and any additional components. For example, inductor coil 303 is positioned in parallel with a snubber circuit in FIG. 3. The snubber circuit includes capacitor 317 and resistor 311. As used herein, the inductor coil 303 is in a "parallel-type arrangement" with capacitor 317 despite the presence of resistor 311. Similarly, the switch 307 is in a "series-type arrangement" with inductor coil 303 despite the presence of the snubber circuit.

Because there is no top-side switch to separate the inactive coil from the power supply circuit, the magnitude of the back EMF generated on the inactive coil may affect the magnitude of the first voltage at node 204 in FIG. 2. As such, voltage generated as back EMF will contribute to the power provided to the microcontroller 213. Capacitors in the power supply, such as capacitor 223, act to float the voltage so that the increased (or decreased) voltage caused by the back EMF does not cause damage to or prevent reliable operation of the microcontroller 213.

Figure 4:
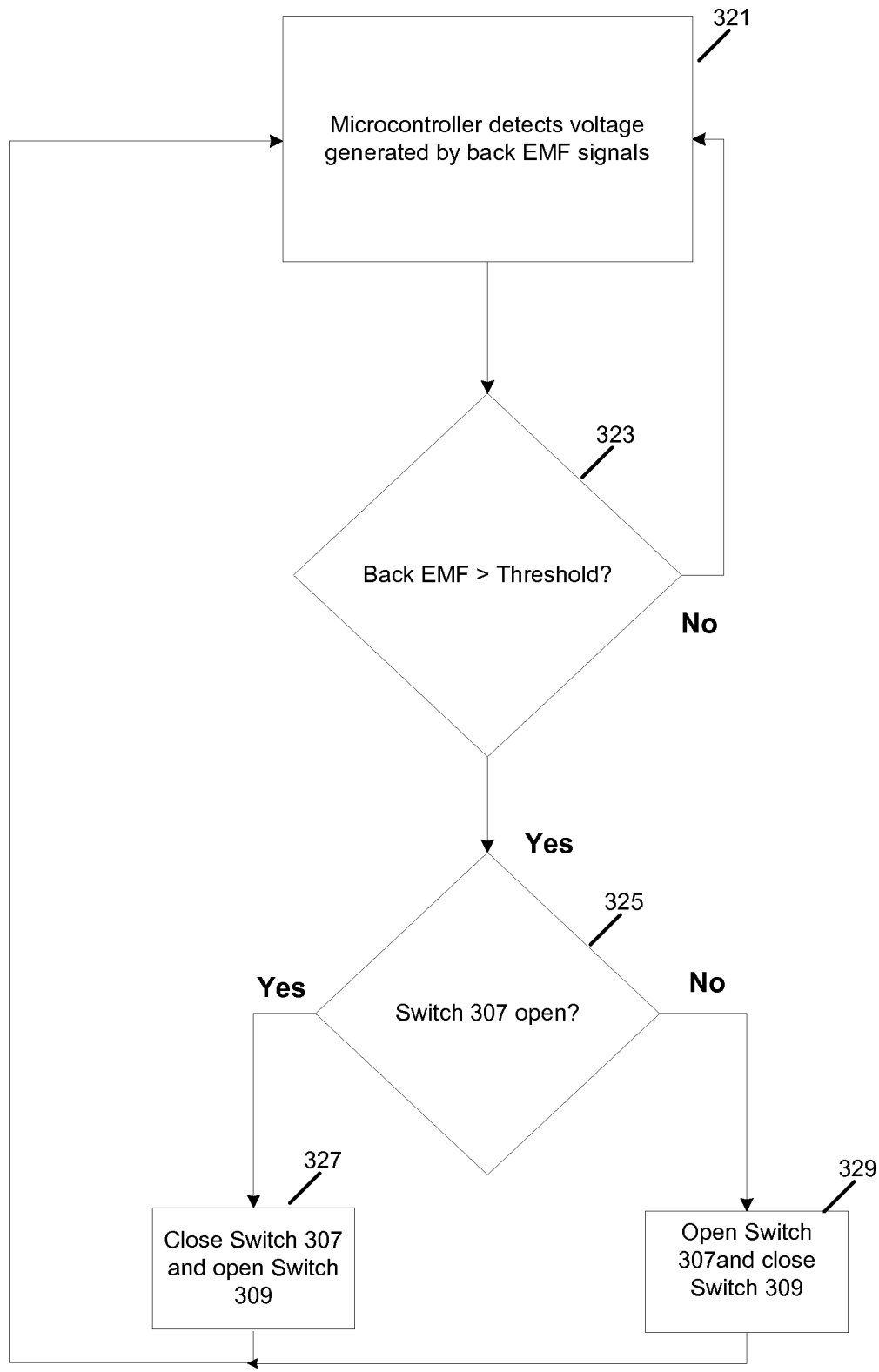
FIG. 4 is a flow chart illustrating a method of monitoring the back EMF of the permanent magnet motor.

The microcontroller 213 controls the operation of the motor 209 by selectively opening and closing the switches 307 and 309 corresponding to inductor coils 303 and 305, respectively. The illustrated control system does not include an additional sensor (e.g., a Hall-effect sensor) to determine the position of the permanent magnet rotor 301. Instead, the microcontroller 213 estimates the position of the permanent magnet motor based on back EMF generated on an inactive inductor coil. The method by which the microcontroller 213 controls the operation of the motor 209 is illustrated in FIG. 4.

While the permanent magnet rotor 301 of the motor 209 is rotating, the microcontroller 213 monitors for back EMF generated by the permanent magnet rotor 301 on the inactive coil (either 303 or 305) (step 321). If the back EMF does not exceed a predetermined threshold, the microcontroller 213 does not change the state of either switch 307 or 309. However, if the back EMF exceeds the threshold (step 323), the microcontroller 213 will proceed to activate the inactive coil and deactivate the active coil. The microcontroller 213 determines which switch is active (step 325). If the switch 307 is open, the microcontroller 213 proceeds to close the switch 307 and open the switch 309. Conversely, if the switch 307 is not open, the microcontroller 213 closes the switch 309 and opens the switch 307. Once the switching is completed, the microcontroller 107 continues to monitor the back EMF on the inactive coil.

Figure 7:
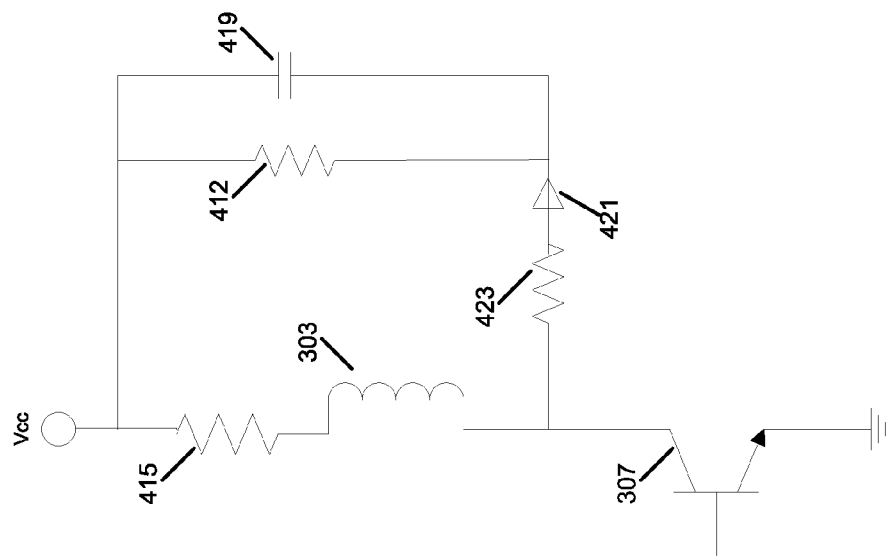
FIGS. 5-7 are schematic representations of alternative snubber circuits that may be included in the permanent magnet motor of FIG. 3.
Figure 6:
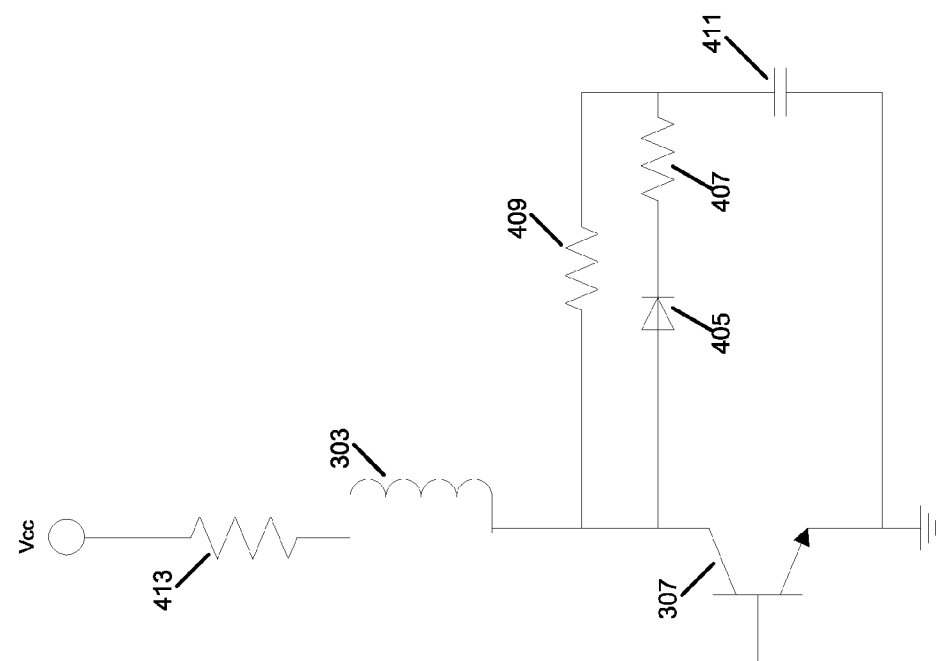
Figure 5:
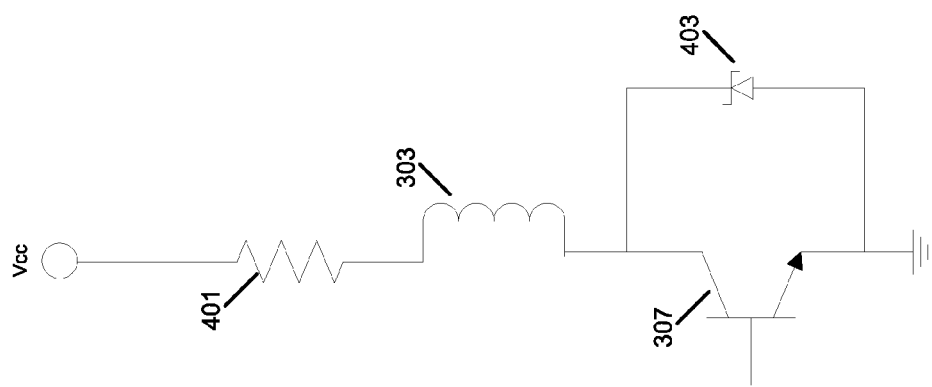

As discussed above, the snubber circuits act to prevent the back EMF generated on the inactive coil from causing negative torque on the permanent magnet rotor 301. FIGS. 5-7 illustrate different types of snubber circuits that may be connected to the inductor coil 303 and the switch 307 in other constructions of the invention.

In FIG. 5, the snubber circuit includes a resistor 401 in series with the inductor coil 303 and a zener diode 403 is connected in parallel to the switch 307.

The snubber circuit of FIG. 6 is also positioned in parallel with the switch 307. A diode 405 in series with a resistor 407 are positioned in parallel with a second resistor 409 to form a first component of the snubber circuit. The first component in series with a capacitor 411 is arranged in parallel with the switch 307. A third resistor 405 is also positioned in series with the inductor coil 303.

The snubber circuit of FIG. 7 includes a resistor 415 is in series with the inductor coil 303. A first component of the snubber circuit includes a second resistor 417 in parallel with a capacitor 419. The first component is arranged in series with a diode 421 and a resistor 423 to form a second component. The second component is connected in a parallel-type arrangement across both the resistor 415 and the inductor coil 303.

The systems and circuits described above only illustrate some of the possible constructions embodying this invention. For example, other power supply arrangements may include different types of AC/DC converters without departing from the scope of the invention. Furthermore, in other constructions, additional components will be added in parallel- or series-type arrangements with the circuit components described above.

Additional, the term "circuit component" as used above is not limited to a single element such as, for example, a single resistor or a single diode. As the phrase is used herein, a "component" of a circuit can include a single circuit element or it may include multiple circuit elements in a particular arrangement.

Various features and advantages of the invention are set forth in the following claims.

What is claimed is:

1. A sensorless electric motor system, comprising:
   a power supply circuit configured to provide a first DC voltage and a second DC voltage;
   an electric motor, powered by the first DC voltage, including a permanent magnet rotor and a plurality of coils, each coil positioned in a series-type arrangement with a corresponding low-side switch, wherein a back EMF generated by the permanent magnet rotor changes a magnitude of the first DC voltage; and
   a control circuit powered by the second DC voltage and configured to control movement of the electric motor by
   monitoring the back EMF,
   determining a position of the permanent magnet rotor based on the back EMF, and
   selectively opening and closing the low-side switches based on the determined position of the permanent magnet rotor.

2. The sensorless electric motor system of claim 1, wherein the control circuit monitors the back EMF by monitoring a magnitude of the first DC voltage.

3. The sensorless electric motor system of claim 1, further comprising a plurality of snubber circuits to prevent the back EMF generated by the permanent motor rotor from causing negative torque on the electric motor.

4. The sensorless electric motor system of claim 3, wherein one snubber circuit of the plurality of snubber circuits includes a zener diode in a parallel-type arrangement with the corresponding low-side switch.

5. The sensorless electric motor system of claim 3, wherein one snubber circuit of the plurality of snubber circuits is positioned in a parallel-type arrangement with the corresponding low-side switch and includes
   a first circuit component including a diode in a series-type arrangement with a first resistor,
   a second circuit component including a second resistor in a parallel-type arrangement with the first circuit component, and
   a capacitor in a series-type arrangement with the second circuit component.

6. The sensorless electric motor system of claim 3, wherein one snubber circuit of the plurality of snubber circuits is positioned in a parallel-type arrangement with one of the plurality of coils and a series-type arrangement with the corresponding low-side switch and includes
   a first circuit component including a first resistor in a series-type arrangement with a diode,
   a second circuit component including a second resistor in a series-type arrangement with the first circuit component, and
   a capacitor in a parallel-type arrangement with the second circuit component.

7. The sensorless electric motor system of claim 1, wherein each snubber circuit of the plurality of snubber circuits is positioned in a parallel-type arrangement with one of the plurality of coils, wherein one snubber circuit of the plurality of snubber circuits includes a capacitor coupled to a resistor in a series-type arrangement.

8. The sensorless electric motor system of claim 1, wherein the control circuit includes a microcontroller.

9. The sensorless electric motor system of claim 1, wherein the power supply circuit includes a first AC-to-DC converter configured to convert AC power from an AC power source to DC power at the first DC voltage.

10. The sensorless electric motor system of claim 9, wherein the power supply includes a second AC-to-DC converter and a capacitor on the AC side configured to float the DC voltage provided to the control circuit.

11. The sensorless electric motor system of claim 9, wherein the second AC-to-DC converter is configured to convert AC power from the AC source to DC power at the second DC voltage.

12. The sensorless electric motor system of claim 1, wherein the electric motor is a unipolar electric motor.

13. The sensorless electric motor system of claim 1, wherein the second DC voltage is derived from the first DC voltage.

14. The sensorless electric motor system of claim 13, wherein the control circuit monitors the back EMF by monitoring a magnitude of the second DC voltage.

* * * * *